United States Patent
Tseng

(10) Patent No.: US 10,069,247 B1
(45) Date of Patent: Sep. 4, 2018

(54) CONNECTOR CAPABLE OF REDUCING SIGNAL INTERFERENCE BETWEEN TWO ROWS OF TERMINALS BY GROUNDING PIN OF GROUNDING PLATE

(71) Applicant: SIMULA TECHNOLOGY INC., Taoyuan (TW)

(72) Inventor: Te-Chih Tseng, Taoyuan (TW)

(73) Assignee: SIMULA TECHNOLOGY INC., Taoyuan, Taoyuan County (TW)

( * ) Notice: Subject to any disclaimer, the term of this patent is extended or adjusted under 35 U.S.C. 154(b) by 0 days.

(21) Appl. No.: 15/700,227

(22) Filed: Sep. 11, 2017

(30) Foreign Application Priority Data

Apr. 24, 2017 (TW) .............................. 106113619 A

(51) Int. Cl.
| | |
|---|---|
| *H01R 13/648* | (2006.01) |
| *H01R 13/658* | (2011.01) |
| *H01R 13/652* | (2006.01) |
| *H01R 13/508* | (2006.01) |
| *H01R 13/641* | (2006.01) |
| *H01R 4/02* | (2006.01) |

(Continued)

(52) U.S. Cl.
CPC ............. *H01R 13/658* (2013.01); *H01R 4/02* (2013.01); *H01R 13/506* (2013.01); *H01R 13/508* (2013.01); *H01R 13/641* (2013.01); *H01R 13/652* (2013.01); *H01R 24/62* (2013.01); *G06F 13/4282* (2013.01); *H01R 13/6658* (2013.01); *H01R 2107/00* (2013.01)

(58) Field of Classification Search
CPC .. H01R 13/648; H01R 13/658; H01R 13/508; H01R 13/641; H01R 13/652; H01R 13/6658; H01R 13/6473; H01R 13/506; H01R 4/02; H01R 2107/00; H01R 24/62; H01R 12/72; H05K 3/341; H05K 1/111; H05K 1/117; H05K 2201/09409; H05K 2201/09418; H05K 2201/10325; G06F 13/4282
USPC ..................................... 439/607.12; 257/696
See application file for complete search history.

(56) References Cited

U.S. PATENT DOCUMENTS

| 4,950,172 A | * | 8/1990 | Anhalt | ............... | H01R 13/6471 |
| | | | | | 439/108 |
| 5,035,632 A | * | 7/1991 | Rudoy | ............... | H01R 13/6471 |
| | | | | | 439/108 |

(Continued)

*Primary Examiner* — Abdullah Riyami
*Assistant Examiner* — Vladimir Imas
(74) *Attorney, Agent, or Firm* — Bacon & Thomas PLLC

(57) ABSTRACT

A connector capable of reducing signal interference between two rows of terminals by grounding pin of a grounding plate includes an insulating base, first terminals, second terminals, and the grounding plate; wherein the first and second terminals are embedded in the insulating base and are adjacent to its top and bottom respectively; and the grounding plate is embedded in the insulating base and lies between the first and second terminals. The connector is characterized in that the soldering portions of the second terminals as well as the first terminals are arranged horizontally and soldered to a circuit board; that the circuit board forms a separation area between the two rows of terminals; and that the grounding plate includes at least one grounding pin soldered to, and adjacent to the center of, the separation area to produce a shielding effect, and thereby prevent signal interference, between the two rows of terminals.

10 Claims, 4 Drawing Sheets

(51) Int. Cl.
  *H01R 24/62* (2011.01)
  *H01R 13/506* (2006.01)
  *H01R 13/66* (2006.01)
  *H01R 107/00* (2006.01)
  *G06F 13/42* (2006.01)

(56) References Cited

U.S. PATENT DOCUMENTS

| | | | | |
|---|---|---|---|---|
| 5,156,554 A * | 10/1992 | Rudoy | | H01R 13/6471 |
| | | | | 439/108 |
| 6,847,529 B2 * | 1/2005 | Dibene, II | | G06F 1/18 |
| | | | | 174/257 |
| 7,112,072 B2 * | 9/2006 | Korsunsky | | H01R 13/652 |
| | | | | 439/108 |
| 7,188,408 B2 * | 3/2007 | Korsunsky | | H01R 23/688 |
| | | | | 228/180.22 |
| 7,279,412 B2 * | 10/2007 | Mok | | H05K 3/462 |
| | | | | 29/829 |
| 7,872,873 B2 * | 1/2011 | Hiew | | G06F 1/1632 |
| | | | | 361/715 |
| 8,900,013 B2 * | 12/2014 | Li | | H01R 12/53 |
| | | | | 439/660 |
| 8,998,620 B2 * | 4/2015 | Ni | | H01R 12/71 |
| | | | | 361/737 |
| 9,048,553 B2 * | 6/2015 | Naito | | G06F 1/20 |
| 9,281,642 B1 * | 3/2016 | Tseng | | H01R 24/60 |
| 9,281,643 B1 * | 3/2016 | Tseng | | H01R 13/518 |
| 9,350,121 B2 * | 5/2016 | Ju | | H01R 13/6585 |
| 9,385,484 B2 * | 7/2016 | Chen | | H01R 13/6594 |
| 9,466,918 B2 * | 10/2016 | Chen | | H01R 13/56 |
| 9,466,930 B2 * | 10/2016 | Little | | H01R 24/60 |
| 9,525,236 B2 * | 12/2016 | Lee | | H01R 13/5202 |
| 9,577,387 B2 * | 2/2017 | Hu | | H01R 13/6597 |
| 9,583,425 B2 * | 2/2017 | Xu | | H01L 23/49811 |
| 9,590,353 B2 * | 3/2017 | Regnier | | H01R 24/62 |
| 9,698,544 B2 * | 7/2017 | Wu | | H01R 13/7175 |
| 9,711,910 B2 * | 7/2017 | Zhao | | H01R 13/6581 |
| 9,768,567 B1 * | 9/2017 | Cheng | | H01R 24/60 |
| 9,780,490 B2 * | 10/2017 | Xing | | H01R 13/64 |
| 9,806,465 B2 * | 10/2017 | Regnier | | H01R 24/62 |
| 9,819,125 B2 * | 11/2017 | Regnier | | H01R 13/6473 |
| 9,865,974 B2 * | 1/2018 | Chen | | H01R 24/62 |
| 9,871,325 B2 * | 1/2018 | Patel | | H01R 12/721 |
| 9,882,308 B1 * | 1/2018 | Yi | | H01R 13/62938 |
| 9,905,944 B2 * | 2/2018 | Little | | H01R 9/038 |
| 9,907,187 B1 * | 2/2018 | Tseng | | H05K 3/341 |
| 2014/0349514 A1 * | 11/2014 | Yang | | H01R 13/6581 |
| | | | | 439/487 |

* cited by examiner

CONNECTOR CAPABLE OF REDUCING SIGNAL INTERFERENCE BETWEEN TWO ROWS OF TERMINALS BY GROUNDING PIN OF GROUNDING PLATE

FIELD OF THE INVENTION

The present invention relates to a connector whose grounding plate includes a grounding pin configured to reduce signal interference between two rows of terminals. More particularly, the invention relates to a connector structure in which a grounding pin is provided on a grounding plate and extends into the space between the soldering portions of two rows of terminals to produce a shielding effect that enhances transmission quality.

BACKGROUND OF THE INVENTION

Connectors for signal and/or power transmission refer generally to connecting devices designed for use with electronic signals and/or electric power and to their accessories. Such connectors can be viewed as bridges for all kinds of signals, and their quality affects the stability of signal and/or current transmission and is therefore crucial to the operation of electronic systems. With the advancement of electronic technology, these connectors have become indispensable features of various electronic devices when it comes to data transmission and connection with peripherals. Of the plethora of connector transmission specifications, Universal Serial Bus (USB) is the most widely used.

Currently, the USB specifications are undergoing a comprehensive upgrade to USB 3.1. In addition, "Type-C connectors" were developed to increase the speed of transmission, the types of signals to be transmitted, and the convenience of hot swapping. One major difference of the Type-C connector structure is its "vertically symmetric configuration", which allows a user to insert a Type-C connector freely and intuitively into a corresponding socket without having to identify the vertical orientation of the connector first. In order for a Type-C connector to be used with either side up, it is necessary that two identical sets of connection terminals be arranged in each such connector, and because of that, a grounding plate must be provided in the connector to separate, and thereby prevent signal interference between, the two sets of terminals.

Given the ongoing trend of electronic device design toward "increasing compactness", however, the aforesaid requirements of USB 3.1 Type-C connectors pose new challenges to manufacture and assembly. More specifically, once the connector structure is downsized, the distance between terminals is bound to shorten, which hinders the grounding plate from shielding the two sets of terminals completely from each other. The issue to be addressed by the present invention is to further improve the conventional connector structure.

BRIEF SUMMARY OF THE INVENTION

Considering that a reduction in size of a Type-C connector does not help reduce signal interference between the two rows of terminals in the connector, the inventor of the present invention incorporated years of practical experience in the industry into extensive research and repeated tests and improvements and finally succeeded in developing a connector capable of reducing signal interference between two rows of terminals by the grounding pin of a grounding plate so that the performance of the connector can be effectively improved without incurring a significant increase in cost.

One objective of the present invention is to provide a connector capable of reducing signal interference between two rows of terminals by the grounding pin of a grounding plate. The connector at least includes an insulating base, a plurality of first terminals, and a plurality of second terminals, in addition to the grounding plate. The first terminals are embedded in the insulating base at a position adjacent to the top of the insulating base. The second terminals are embedded in the insulating base at a position adjacent to the bottom of the insulating base. The grounding plate is embedded in the insulating base at a position between the first terminals and the second terminals. The connector is characterized in that each of the first terminals has a rear end provided with a first soldering portion; that the first soldering portions are arranged horizontally and each have a free end soldered to one of a plurality of first contacts on a circuit board; that each of the second terminals has a rear end provided with a second soldering portion; that the second soldering portions are arranged horizontally and each have a free end soldered to one of a plurality of second contacts on the circuit board, thus spacing each of the second soldering portions apart from a corresponding one of the first soldering portions and defining the area on the circuit board that corresponds to the space between the first soldering portions and the second soldering portions as a separation area; that the grounding plate has a rear end provided with at least one first grounding pin; that the first grounding pin has one end connected to the grounding plate and a free end extending into the space between the first soldering portions and the second soldering portions and soldered to the separation area on the circuit board; and that a predetermined distance exists between the first grounding pin and each of two opposite lateral sides of the separation area. The grounding pin extending from the grounding plate serves as a shielding structure that enhances the overall transmission stability of the connector by effectively reducing interference between the two rows of terminals during signal transmission.

BRIEF DESCRIPTION OF THE SEVERAL VIEWS OF THE DRAWINGS

The technical features of the present invention can be better understood by referring to the following detailed description of an illustrative embodiment in conjunction with the accompanying drawings, in which.

DETAILED DESCRIPTION OF THE INVENTION

Figure 1:
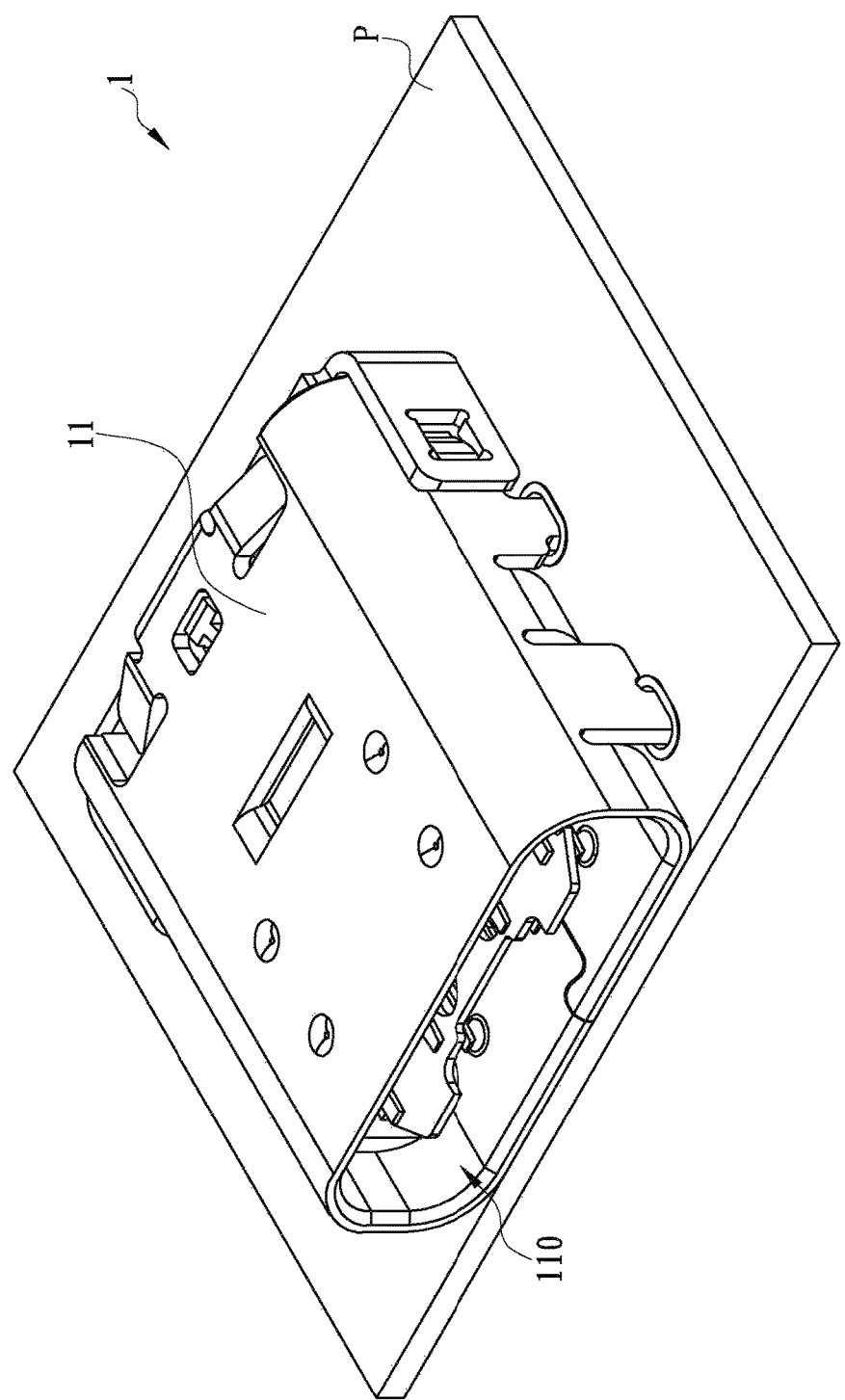
FIG. 1 is a perspective view of a connector according to the present invention.

During his research, the inventor of the present invention has found that the grounding plate in a conventional Type-C connector is typically connected to a metal housing via the "lateral sides" of the grounding plate and does not extend rearward into the space between the soldering portions of the two rows of terminals; in other words, the soldering portions of one of the two rows of terminals are not shielded from those of the other row. It then occurred to the inventor that a shielding structure might be provided in this neglected space between the soldering portions of the two rows of terminals to improve signal transmission effectively.

The present invention provides a connector 1 capable of reducing signal interference between two rows of terminals by the grounding pin of a grounding plate. Referring to FIGS. 1-4, the connector 1 at least includes a housing 11, an insulating base 12, a plurality of first terminals 13, a plurality of second terminals 14, and a grounding plate 15. The housing 11 is provided therein with a receiving space 110 for receiving the insulating base 12. It is worth mentioning that the insulating base 12 may be formed by injection molding in order to enclose predetermined portions of the terminals 13, 14 and of the grounding plate 15. It is also feasible that several plastic members are individually formed by injection molding to enclose predetermined portions of the terminals 13, 14 and of the grounding plate 15 respectively, and that the plastic members are subsequently put together to form the insulating base 12. The forming and assembly methods of the insulating base 12 are not essential features of the present invention.

Figure 2:
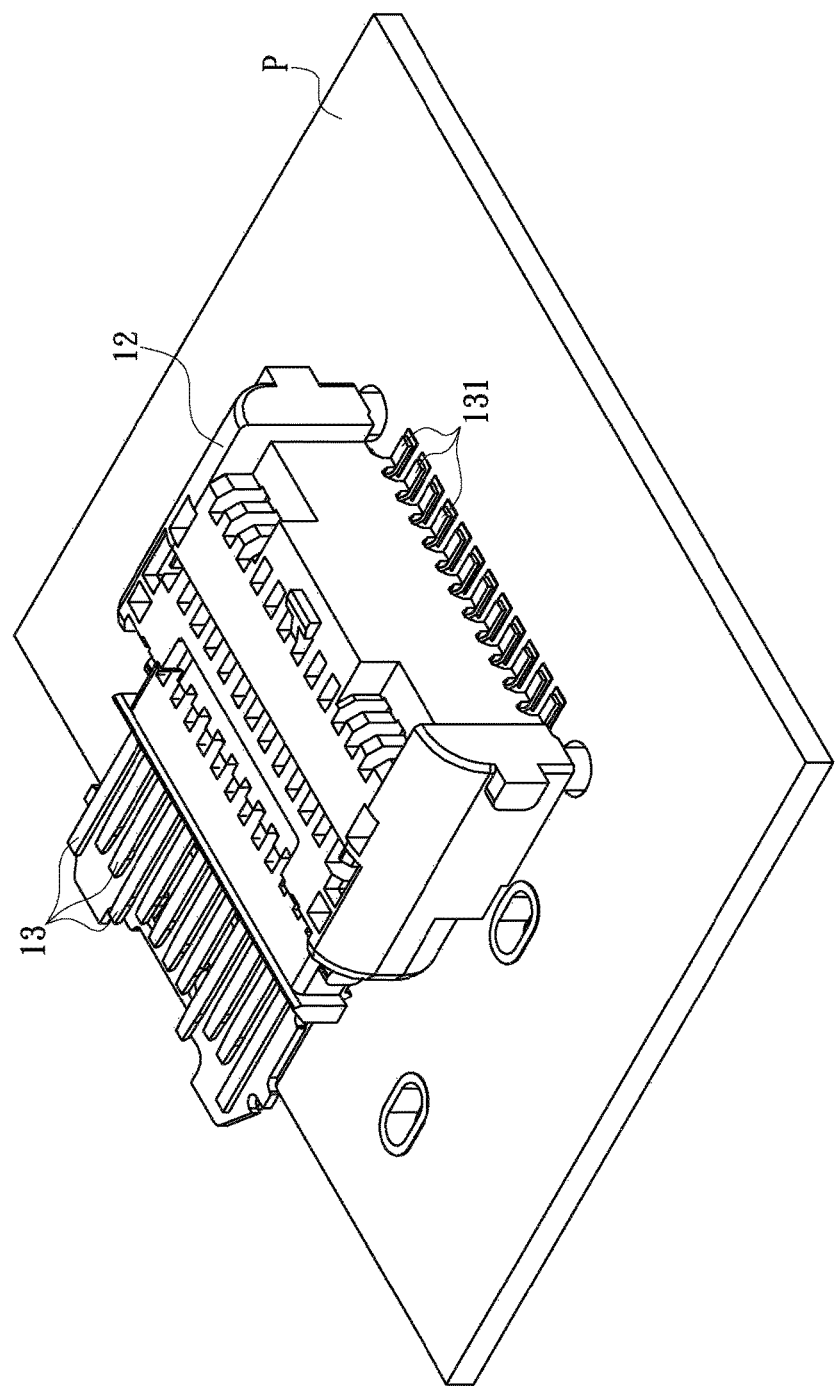
FIG. 2 is a perspective view showing in particular the rear side of the insulating base of the connector in FIG. 1.
Figure 3:
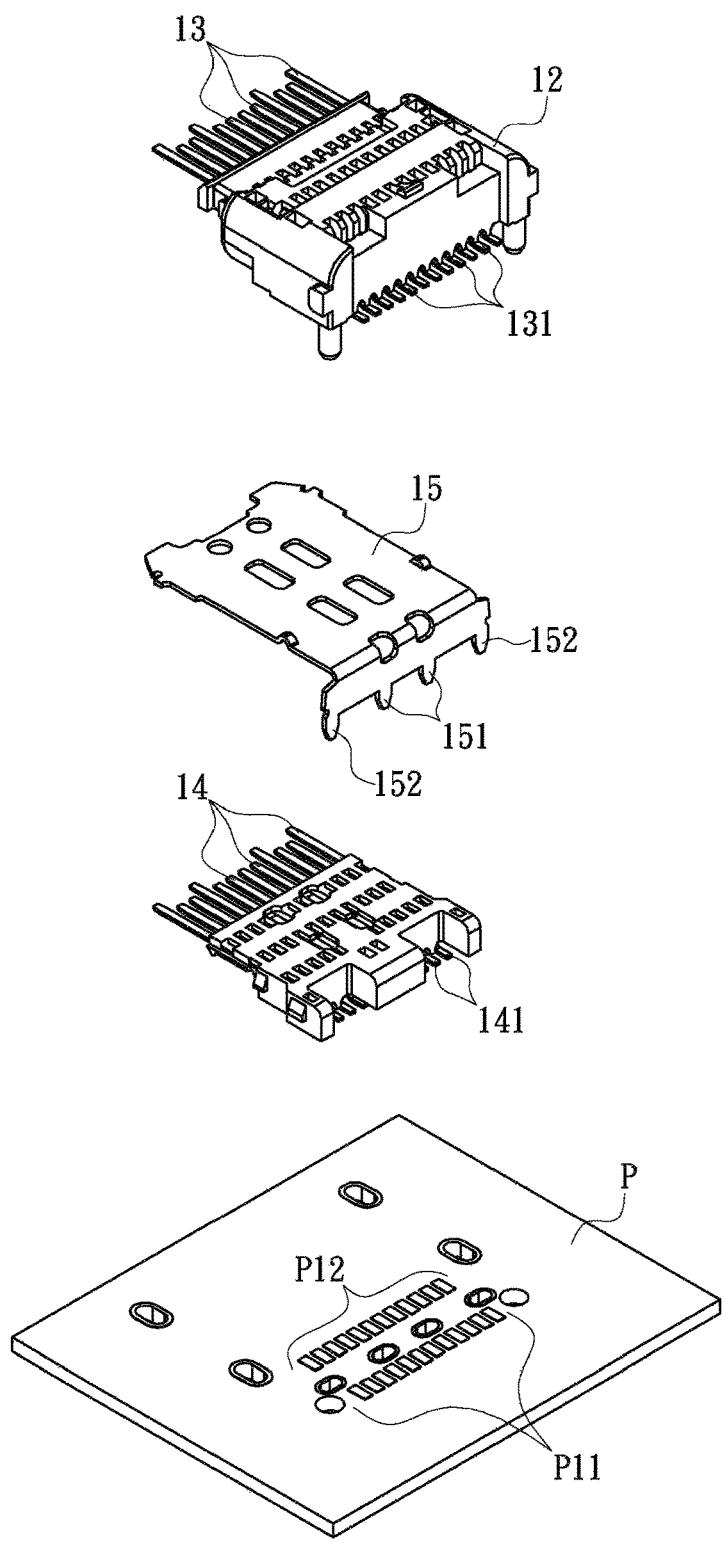
FIG. 3 is an exploded perspective view of the two sets of terminals and the grounding plate of the connector in FIG. 1 and a circuit board to which the connector is to be mounted.
Figure 4:
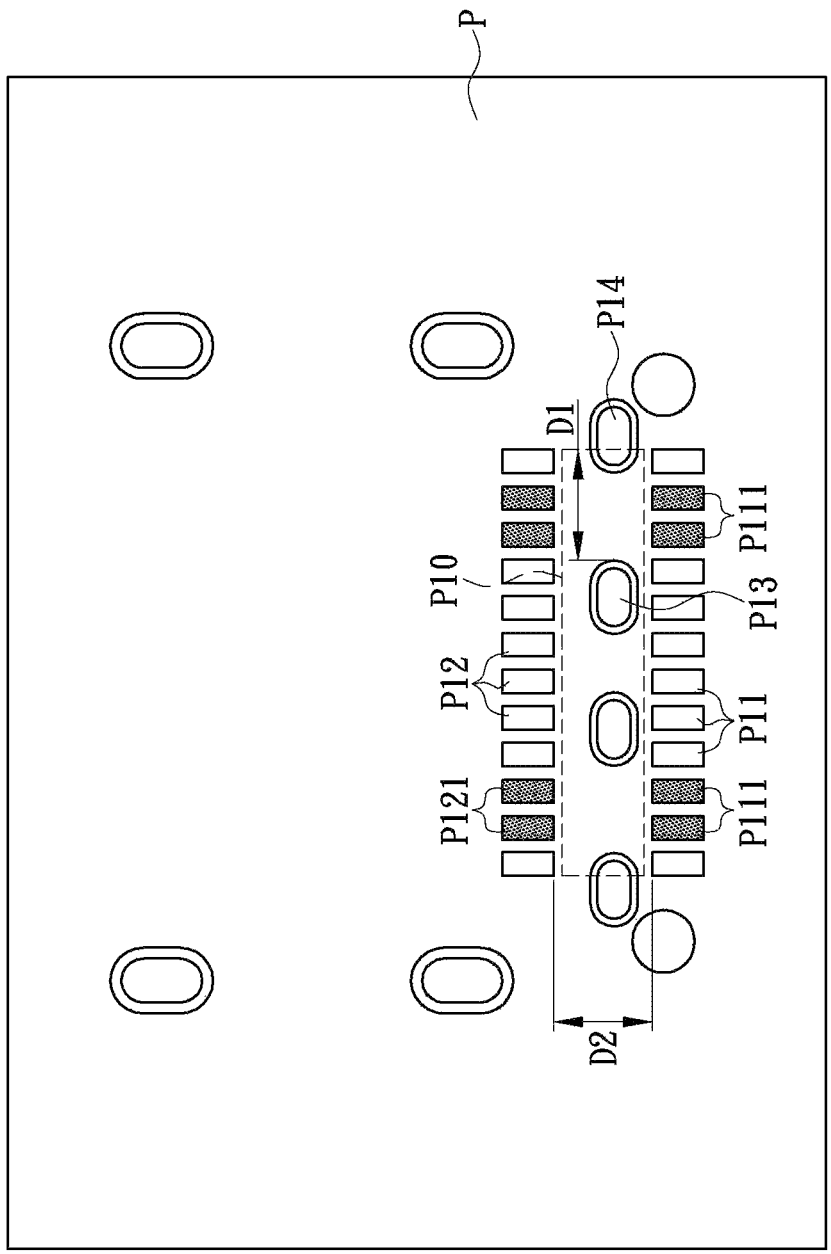
FIG. 4 is a plan view of the circuit board in FIG. 3.

In this embodiment, referring to FIGS. 2-4, the middle sections of the first terminals 13 are embedded in the insulating base 12 at a position adjacent to the top of the insulating base 12 by an insertion operation or by injection molding, and the rear end of each first terminal 13 is provided with a first soldering portion 131. The second terminals 14 are provided in a plastic member by an insertion operation or by injection molding, before the plastic member is embedded into the insulating base 12 at a position adjacent to the bottom of the insulating base 12. The rear end of each second terminal 14 is provided with a second soldering portion 141. The grounding plate 15 is embedded in the insulating base 12 at a position between the first terminals 13 and the second terminals 14.

The soldering portions 131, 141 are configured to be soldered to a circuit board P, which is shown in FIG. 4 in a plan view. The circuit board P is provided with two rows of contacts that extend horizontally, namely a plurality of first contacts P11 and a plurality of second contacts P12. The first soldering portions 131 are arranged horizontally, and their respective free ends are configured to be soldered to the first contacts P11 respectively. The second soldering portions 141 are also arranged horizontally, and their respective free ends are configured to be soldered to the second contacts P12 on the circuit board P respectively. Once the soldering portions 131, 141 are soldered to the circuit board P, each second soldering portion 141 is spaced apart from a corresponding one of the first soldering portions 131, and a separation area P10 is formed on the circuit board P between the first soldering portions 131 and the second soldering portions 141. The width of the separation area P10 is equal to the width of the entire row of contacts P11 and the width of the entire row of contacts P12.

The rear end of the grounding plate 15 is provided with at least one first grounding pin 151. The first grounding pin 151 has one end connected to the grounding plate 15 and a free end extending into the space between the first soldering portions 131 and the second soldering portions 141 so as to be soldered to the separation area P10 on the circuit board P. There is a predetermined distance between the first grounding pin 151 and each of the two opposite lateral sides of the separation area P10.

The first grounding pin 151, which lies between the soldering portions 131, 141 of the two rows of terminals 13, 14, produces a shielding effect between the corresponding soldering portions 131, 141 and thereby prevents signal interference between the soldering portions 131, 141 of the two rows of terminals 13, 14. According to tests conducted by the inventor of the present invention, the free end of the first grounding pin 151 must be spaced apart from each of the two opposite lateral sides of the separation area P10 by a predetermined distance in order to produce the desired shielding effect to the fullest extent.

The specifications of Type-C connectors require that the first terminals 13 include two pairs of first high-frequency terminals and that the second terminals 14 include two pairs of second high-frequency terminals. The relative positions of the high-frequency terminals are described below with reference to the plan view of the circuit board P in FIG. 4: the first high-frequency terminals and the second high-frequency terminals are soldered to the first high-frequency contacts P111 (indicated by dark-color blocks in FIG. 4) and the second high-frequency contacts P121 (indicated also by dark-color blocks in FIG. 4) respectively, the soldering portions of the first high-frequency terminals correspond in position to the soldering portions of the second high-frequency terminals respectively (i.e., the first high-frequency contacts P111 correspond in position to the second high-frequency contacts P121 respectively), and the free end of the first grounding pin 151 is soldered to the separation area P10 at a position between the first high-frequency terminals and the second high-frequency terminals to prevent signal interference between the high-frequency terminals.

For example, when the positions of the first high-frequency contacts P111 and of the second high-frequency contacts P121 are as shown in FIG. 4, the distance D1 between the free end of the first grounding pin 151 and each of the two opposite lateral sides of the separation area P10 is preferably 0.05-2.9 cm, more preferably 0.3-0.5 cm. Also, the distance D2 between the first contacts P11 and the second contacts P12 in this embodiment ranges from 0.3 cm to 5 cm, preferably from 0.90 cm to 5 cm, so that the separation area P10 is large enough for the first grounding pin 151 to be soldered thereto without forming a short circuit with any of the contacts P11, P12.

Test results show that, when the first grounding pin 151 was soldered to the separation area P10 at a position between the high-frequency terminals (i.e., between the high-frequency contacts P111, P121), the connector 1 not only performed better than its conventional counterparts (i.e., connectors whose grounding plate does not extend as far as the terminal soldering positions) in terms of simulated characteristic impedance, simulated insertion loss, and simulated return loss, but also resulted in zero simulated near-end crosstalk (simulated NEXT) during high-frequency signal transmission.

Besides, while the terminals 13, 14 in FIGS. 1-4 are shown as soldered to the circuit board P by the surface-mount technology (SMT), the dual in-line package (DIP) method may be used instead whereby the terminals 13, 14 are soldered to corresponding through holes in the circuit board P respectively. Furthermore, the separation area P10 of the circuit board P is provided with at least one first grounding hole P13, and the free end of the first grounding pin 151 is passed through the first grounding hole P13 and fixed to the circuit board P with solder (e.g., a tin-based solder paste).

In this embodiment, the grounding plate 15 is actually provided with two first grounding pins 151 and is further provided with two second grounding pins 152. The free end of each second grounding pin 152 is soldered to the circuit board P at a position adjacent to one of the two opposite lateral sides of the separation area P10 to further enhance the shielding effect. Correspondingly, the circuit board P is provided with two second grounding holes P14 that are adjacent to the two opposite lateral sides of the separation area P10 respectively. The free ends of the second grounding pins 152 are passed through the second grounding holes P14 respectively and fixed to the circuit board P with solder (e.g., a tin-based solder paste).

To simplify the soldering process and achieve even better grounding effect, referring again to FIG. 4, each second grounding pin 152 can be soldered to a corresponding one of the two outermost first contacts P11, a corresponding one of the two outermost second contacts P12 (the four outermost contacts being grounding contacts), and an adjacent one of the second grounding holes P14 at the same time so that short circuits are formed between each second grounding hole P14 and the corresponding grounding contacts to further enhance the grounding effect.

The embodiment described above is but a preferred one of the present invention and is not intended to be restrictive of the technical features of the invention. All equivalent changes easily conceivable by a person of ordinary skill in the art who has read the technical contents disclosed herein should fall within the scope of the present invention.

What is claimed is:

1. A connector capable of reducing signal interference between two rows of terminals by a grounding pin of a grounding plate, wherein the connector comprises an insulating base, a plurality of first terminals, a plurality of second terminals, and the grounding plate; the first terminals are embedded in the insulating base at a position adjacent to a top of the insulating base; the second terminals are embedded in the insulating base at a position adjacent to a bottom of the insulating base; and the grounding plate is embedded in the insulating base at a position between the first terminals and the second terminals; the connector being characterized in that:

each of the first terminals has a rear end provided with a first soldering portion, and the first soldering portions are arranged horizontally and each have a free end soldered to one of a plurality of first contacts on a circuit board;

each of the second terminals has a rear end provided with a second soldering portion, and the second soldering portions are arranged horizontally and each have a free end soldered to one of a plurality of second contacts on the circuit board such that each of the second soldering portions is spaced apart from a corresponding one of the first soldering portions, with the circuit board forming a separation area corresponding to a space between the first soldering portions and the second soldering portions; and the grounding plate has a rear end provided with at least one first grounding pin, the first grounding pin has a free end extending into the space between the first soldering portions and the second soldering portions and soldered to the separation area on the circuit board, and the first grounding pin is spaced apart from each of two opposite lateral sides of the separation area by a predetermined distance.

2. The connector of claim 1, wherein the first terminals include two pairs of first high-frequency terminals, the second terminals include two pairs of second high-frequency terminals, the soldering portions of the first high-frequency terminals correspond in position to the soldering portions of the second high-frequency terminals respectively, and the free end of the first grounding pin is soldered to the separation area at a position between the first high-frequency terminals and the second high-frequency terminals.

3. The connector of claim 2, wherein the free end of the first grounding pin is spaced apart from each of the two opposite lateral sides of the separation area by a distance ranging from 0.05 cm to 2.9 cm.

4. The connector of claim 3, wherein the free end of the first grounding pin is spaced apart from each of the two opposite lateral sides of the separation area by a distance ranging from 0.3 cm to 0.5 cm.

5. The connector of claim 4, wherein the first contacts and the second contacts are spaced apart by a distance ranging from 0.3 cm to 5 cm.

6. The connector of claim 5, wherein the first contacts and the second contacts are spaced apart by a distance ranging from 0.90 cm to 5 cm.

7. The connector of claim 6, wherein the separation area of the circuit board is provided with at least one first grounding hole, and the free end of the first grounding pin is passed through the first grounding hole and soldered to the circuit board.

8. The connector of claim 7, wherein the grounding plate is provided with two said first grounding pins.

9. The connector of claim 8, wherein the grounding plate is further provided with two second grounding pins, and each of the second grounding pins has a free end soldered to the circuit board at a position adjacent to one of the two opposite lateral sides of the separation area.

10. The connector of claim 9, wherein the circuit board is provided with two second grounding holes respectively adjacent to the two opposite lateral sides of the separation area, and the free ends of the second grounding pins are passed through the second grounding holes respectively and soldered to the circuit board.

* * * * *